M. FLATHER.
CLUTCH.
APPLICATION FILED DEC. 9, 1903.
918,838.
Patented Apr. 20, 1909.
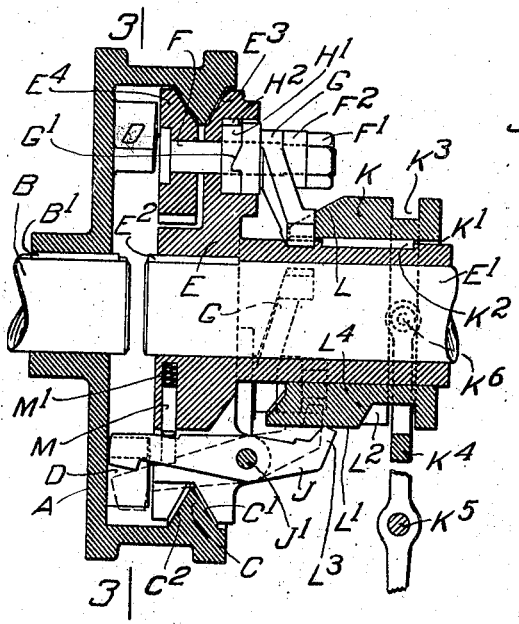
FIG. 2.
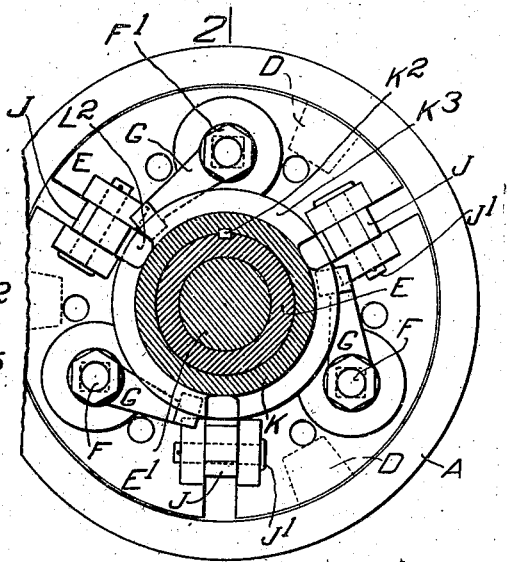
FIG. 1.
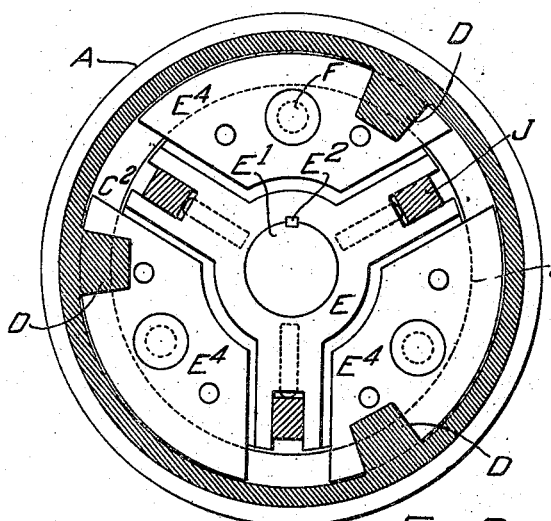
FIG. 3.
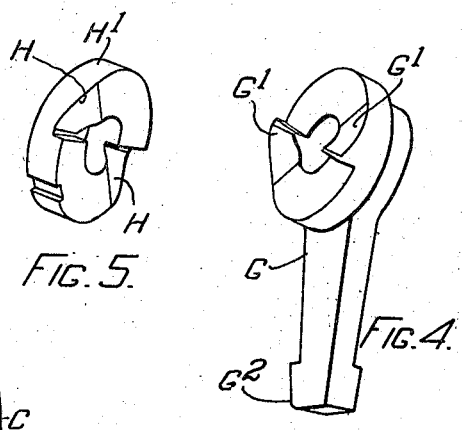
FIG. 5.
FIG. 4.
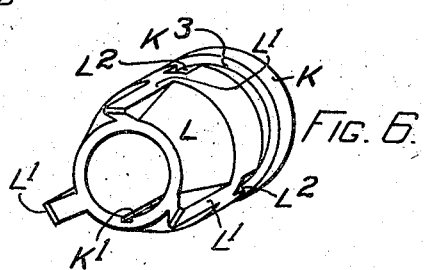
FIG. 6.
WITNESSES
A. T. Palmer
H. M. Kelso
INVENTOR
Mark Flather
by Richard P. Elliott
his Attorney

UNITED STATES PATENT OFFICE.

MARK FLATHER, OF NASHUA, NEW HAMPSHIRE.

CLUTCH.

No. 918,838.  Specification of Letters Patent.  Patented April 20, 1909.

Application filed December 9, 1903. Serial No. 184,498.

*To all whom it may concern:*

Be it known that I, MARK FLATHER, a citizen of the United States, residing at Nashua, county of Hillsboro, and State of New Hampshire, have invented certain new and useful Improvements in Clutches, of which the following is a specification, reference being had to the drawings which accompany the same.
The object of my invention is to provide a clutch for connecting a non-active member, such as the disconnected part of a piece of shafting, with an active or driven member, such as a shafting revolved by any suitable power generating means.

Another object of my invention is to provide in the same device a friction clutch and a positive clutch, the purpose of this being to start a non-active member or driven member from a driving member without shock or jar, but to positively lock both members when they are in full operation and revolving at the same speed.

In the drawings accompanying this specification—Figure 1 represents a front elevation of my device showing the clutch operating members. Fig. 2 is a sectional view through line 2—2, Fig. 1, with one of the friction clutch operating levers shown in full.
Fig. 3 is a sectional elevation through line 3—3, Fig. 2. Fig. 4 is a perspective view of one of the clutch levers for operating the friction clutch. Fig. 5 shows a washer with cam surfaces on, adapted to interact with the clutch lever Fig. 4. Fig. 6 is a perspective view of the clutch operating member.

In the drawings embodying my invention, A represents the driving member of my clutch keyed to the shaft B by the key B', and is provided with what might be termed a friction web C, provided with the inclined friction surfaces C' and C², also the abutments D, D, D.

E is the clutch member attached to the member to be driven or revolved by the member B.

In the drawings, I have shown my device as having three friction levers and three positive clutch levers, but three of such members are used in this instance for convenience only, as any number may be used from one upward, with exactly the same results. Again, it may be stated that the portion or member B and the clutch member A, or the driving members, may be inactive, and the portion E' and the clutch portion E, the active or driving members, with precisely the same result. In this specification I have designated the member B as the active or driving member for the purpose of description only. The clutch member E is keyed to the member E' by the key E². It also has the inclined face extending around its periphery inclined to the same angle and adapted to fit against the inclined portion C'. It also has recesses, in which are mounted by suitable bolts and steady pins, friction members E⁴, E⁴, E⁴, which are provided with faces inclined at the same angle as the inclined faces C² and adapted to fit and bear against the same. Through holes in the members E⁴ are fitted bolts F, to the outer end of which are screw-threaded suitable nuts F' provided with washers F² under them. Surrounding said bolts, and freely revolving thereon, are the friction clutch levers G, which are provided with the cam surfaces G', G', adapted to bear against the cam surfaces H, H of the member H', said member H' being mounted in a recess in the clutch member E and keyed thereto by the key H² to prevent it from revolving in said recess. There is also pivoted in the member E the positive clutch members J and arranged to oscillate from the position shown in full lines in Fig. 2 to the position shown in dotted lines same figure, in order that they may move outward when the clutch members are in certain positions and contact with the sides of the lugs D. K represents the clutch operating member, and is provided with a key-way K' adapted to slide upon the key K² secured in the clutch member E. Said member K is provided with the groove K³ adapted to receive the operating member K⁴. The member K⁴ may be any suitably arranged lever pivoted substantially as shown, at K⁵ so that it can be oscillated, and through its outer end K⁶ slide the clutch operating member K upon the outside of the hub of the member E, as shown. This clutch member K is provided with inclined surfaces L, and the straight surfaces L', as well as the recesses L², in which the outer end L³ of the positive clutch levers J may drop when the clutch operating member K is pushed to its extreme inward position. The incline L is adapted to contact with the inner face of the friction clutch operating member G and throw its outer end G² outward to cause the inclined faces E³ and E⁴ to bind against the inclined faces C' and C² of the rib C; this through the medium of the cam surfaces G', G', riding upward upon the cam surfaces H, H. This description of the operation of the friction clutch lever G and the positive clutch lever J applies to each of said similar members contained in my completed clutch.

M is a spring-operated plug, which has a bearing in holes in the clutch member E, and is pressed outward by a spring M'. The action of the spring-plug M is to throw the inner ends of the positive clutch members J outwardly with their outer ends held against the surfaces L' under tension, so that when the clutch operating member K is moved inwardly to its full throw, said positive clutch members J will swing upon their pivots J', their outer ends L³ dropping into the recess L². When it is desired to disengage the positive clutch members, the member K is moved outward, and the end of the lever J rides upwardly on the inclined surface L⁴ of the recess L², thereby throwing the inner ends of the said levers J out of engagement with the lugs D.

The operation of my improved device is as follows:—Assuming the portion B to be the driving portion, and the portion E' the driven portion; when it is desired to start the driven portion, the clutch operating member K is moved to the left as illustrated in Fig. 2, by suitable means, as the lever K⁴, thereby causing the ends G² of the friction clutch member G to ride up upon the inclined faces L, thereby rotating said member G and causing its cams G' to move upward upon the cams H. This draws the member E⁴ inwardly, so its inclined surfaces will bear against the inclined faces C², at the same time causing the inclined faces of the clutch member E³, E³, to bear against the faces C' of the member E. This frictionally interlocks the member A and the member E but avoids excessive shock or jar by reason of the slipping of the inclined faces upon each other until the driven member E' has approximately reached the same speed of rotation as the driving member B. This causes the driven member to be revolved by friction. During the first movement of the clutch operating member K, the portion L³ of the lever J rides upon the straight surface L', thereby keeping the inner ends of the positive clutch levers J out of contact with the lugs D. A further movement of the clutch operating member K to the left, causes it to assume a position where the lever J will oscillate upon its pivot J', and the portion L³ enter a recess L², thereby allowing its inner end to move outward to the position shown in the dotted lines Fig. 2, and contact with the lugs or abutments D, in case the friction clutch surfaces slip upon each other, making the clutch what might be termed a positive driving clutch.

As has been before stated, I do not confine myself to the number of friction operating levers or positive clutch members shown in the drawings, as the number may be varied without departing from the spirit of my invention. The number of friction clutch operating members G and the positive clutch members J will be varied as the size of the clutch and the number of horse power to be transmitted increases or decreases.

Having described my invention and its mode of operation, what I claim is:—

1. The combination in a clutch of a driving and a driven member; means for frictionally engaging the driving with the driven member, comprising V-shaped frictional surfaces on both said members; a plurality of gripping devices mounted in the driven member, comprising stationary and rotatable cam members; levers secured to the rotatable cam members; a sliding sleeve adapted to contact with said levers; and means for causing the sliding sleeve to move longitudinally to partially rotate said levers to engage the driving with the driven member.

2. The combination in a clutch of driving and driven members, and means for driving the driven member from the driving member both frictionally and positively, comprising a plurality of gripping members, composed of a disk having cam surfaces; levers having corresponding cam surfaces; a sleeve for partially rotating said levers; lugs on the driven member; interlocking levers pivoted in said lugs; springs for throwing said interlocking levers in contact with lugs on the driving member; means for sliding the sleeve longitudinally; cam surfaces on the sleeve adapted to permit the interlocking levers to engage the lugs on the driving member and to permit the disengagement of said interlocking levers from their engagement with said lugs on the driving member.

In testimony whereof, I have hereunto set my hand, in the presence of two subscribing witnesses, this the second day of December, A. D. 1903.

MARK FLATHER.

Witnesses:
R. P. ELLIOTT,
H. M. KELSO.